(12) United States Patent
Gabber et al.

(10) Patent No.: US 6,191,739 B1
(45) Date of Patent: Feb. 20, 2001

(54) METHOD AND APPARATUS FOR DETECTING THE MOVEMENT OF A DEVICE THAT RECEIVES A SIGNAL BROADCAST FROM A RELATIVE FIXED POSITION

(75) Inventors: Eran Gabber, Summit; Avishai Wool, Livingston, both of NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/170,015

(22) Filed: Oct. 13, 1998

(51) Int. Cl.⁷ ............................... G08B 13/14; G01S 3/02
(52) U.S. Cl. ................ 342/458; 342/357.07; 340/568.1; 340/825.36
(58) Field of Search .............................. 342/458, 357.07, 342/357.17; 348/9; 340/568.1, 686.6, 825.36, 825.47, 572.4, 686.1

(56) References Cited

U.S. PATENT DOCUMENTS

| | | | |
|---|---|---|---|
| 5,550,551 | * 8/1996 | Alesio | 342/357.07 |
| 5,552,772 | * 9/1996 | Janky et al. | 340/825.36 |
| 5,621,793 | * 4/1997 | Bednarek et al. | 380/240 |
| 5,949,350 | * 9/1999 | Girard et al. | 340/825.49 |
| 5,999,629 | * 12/1999 | Heer et al. | 705/51 |

OTHER PUBLICATIONS

R. Anderson and M. Kuhn, "Low Cost Attacks on Tamper Resistant Devices," 5th Security Protocols Workshop, LNCS 1361, 1250–136 (Apr., 1997).

P.J. Britt, "Return Path Simplified: Wireless Modem Jacks Save Cable TV Installation Time," Telephony, vol. 234, No. 7, 14 (Feb. 1998).

P.H. Dana, "Global Positioning System Overview," The Geographers Craft Project, Dept. of Geography, Univ. of Texas at Austin, downloaded from www.utexas.edu/depts/grg/grcraft/notes/gps/gps.html (Sep. 1994).

DirecTV System Technology, "The High–Tech Behind Broadcasting DirecTV," downloaded from www.directv.com/hardware/tech.html (1998).

Recommendation ITU–R BO.1211, Digital Multi–Programme Emission System for Television, Sound and Data Services for Satellites Operating in the 11/12 GHz Frequency Range, International Telecommunications Union (1995).

B.M. Macq and J.–J. Quisquater, "Cryptology for Digital TV Broadcasting," Proc. of the IEEE, vol. 83, No. 6, 944–57 (Jun. 1995).

ORBCOMM System Description, ORBCOMM Corp., downloaded from www.orbcomm.com/about/sysdesc.html.

* cited by examiner

Primary Examiner—Gregory C. Issing
(74) Attorney, Agent, or Firm—Ryan, Mason & Lewis, LLP

(57) ABSTRACT

A system for detecting the movement of a device that receives a signal broadcast from a relative fixed position, such as a set-top terminal in a Direct Broadcast Satellite (DBS) system, is disclosed, using the phase shift of the broadcast signal, as received by the device. A set-top terminal or similar mechanism restricts access to the transmitted multimedia information using stored decryption keys. If a set-top terminal is moved, the distance between the set-top terminal and the satellite will change, thereby causing a measurable phase shift in the signal received by the set-top terminal. The set-top terminal periodically or intermittently records a sequence of bits received from the satellite and provides the recorded bits to the service provider server for analysis. If the set-top terminal has been moved, the recorded bits will shift. The sequence of bits may be recorded at random intervals, triggered by an external event, shown, for example, by an accurate internal clock, a request sent by a terrestrial paging network, or a request sent by a low-earth-orbit (LEO) satellite messaging system. The service provider detects relative movements of the set-top terminals by instructing a group of set-top terminals in geographical proximity to start recording at the same time, and comparing the sequence of bits recorded by each set-top terminal.

20 Claims, 7 Drawing Sheets

"METHOD AND APPARATUS FOR
DETECTING THE MOVEMENT OF A
DEVICE THAT RECEIVES A SIGNAL
BROADCAST FROM A RELATIVE FIXED
POSITION

CROSS REFERENCE TO RELATED APPLICATION

The present invention is related to United States patent application entitled "Method And Apparatus For Determining the Location of a Device Using Enhanced 911 Cellular Service," Ser. No. 09/170,304, filed contemporaneously herewith, assigned to the assignee of the present invention and incorporated by reference herein.

FIELD OF THE INVENTION

The present invention relates generally to a system for preventing unauthorized movement of devices that receive a signal from a relative fixed position, and more particularly, to a system for detecting the movement of a set-top terminal in a Direct Broadcast Satellite (DBS) system.

BACKGROUND OF THE INVENTION

Direct Broadcasting Satellite (DBS) systems have become increasingly popular in many parts of the world. DBS systems transmit the programming content to a geosynchronous satellite, which broadcasts it back to the customers. In such a wireless broadcast environment, the transmitted programming can be received by anyone with an appropriate receiver, such as an antenna or a satellite dish. Thus, in order to restrict access to a transmitted program to authorized customers, the service provider typically encrypts the transmitted programs and provides the customer with a set-top terminal (STT) containing one or more decryption keys which may be utilized to decrypt programs that the customer is entitled to. In this manner, the set-top terminal receives encrypted transmissions and decrypts the programs that the customer is entitled to, but nothing else.

Piracy is a major problem for DBS service providers. Therefore, the management of the decryption keys is central to the design of such systems. For a more detailed discussion of key management techniques, see, for example, B. M. Macq and J. J. Quisquater, Cryptology for Digital TV Broadcasting, Proc. of IEEE, 83(6), 944–57 (1995). An important aspect of key management is how the keys for the next billing period are downloaded into the customer's STT. Modem DBS systems typically use a "callback" (or "return path") scheme for this purpose, whereby the STT makes a phone call to the service provider once per billing period, authenticates itself, and downloads the new keys.

In many cases, the service providers would like to monitor the location at which their customers install the STTs, and more importantly, to detect when a customer moves his or her STT to a new location. Under certain circumstances, the movement of the STT may be a form of piracy or otherwise unauthorized. For example, a customer in a first country may not be able to legitimately buy a set-top terminal for a service originating in a second country, even though the satellite's signal is received in the first country, due to various financial, political or copyright restrictions. Nonetheless, a "grey market" may result, in which the STTs are bought in the second country and imported (or smuggled) into the first country. Thus, the service provider would like to detect such activities in order to ensure that STTs that are moved to the first country would not function there.

The movement of STTs may be a form of piracy even without crossing international borders. A service provider would also like to restrict the movement of an STT from a customer's residence to a commercial venue such as a theater or a bar (where a subscription is generally more expensive).

Modern telephone switches provide two features for identifying the calling party, namely, the automatic number identification (ANI) feature, which transfers the calling party's identification to another switch, and the calling number delivery (CND) feature, which transfers the calling party's phone number to the callee. Usually, but not always, the ANI and CND contain the same information. The CND feature is commonly known as the "caller ID" feature.

The "caller ID" feature can be enabled and disabled by the caller by dialing certain codes before the number. In contrast, the ANI feature is automatic and cannot be disabled by the caller. This feature is currently used to locate callers to emergency services (such as "911" in the United States). Since a caller's ANI is readily available for calls to toll-free numbers in the United States, many service providers currently use the ANI to obtain the location of the caller. In the following discussion, the popular name "caller-ID" will apply to either ANI or CND. The service provider maintains a database of the phone number(s) of each customer. In this manner, whenever the customer calls the service provider, the service provider can verify that the call is coming from the customer's designated phone number.

The caller ID feature has been utilized to detect STT movement in DBS systems by implementing a caller ID verification of the callback. It is again noted that the STT needs to make a phone call to the service provider at least once every billing period in order to download decryption keys and upload usage information. During this callback, the STT and the service provider run a cryptographic protocol to authenticate both parties, guarantee the integrity of the data, and prohibit eavesdropping. As part of the authentication, the service provider can match the phone number obtained from the caller ID against the number on record for this particular customer's STT, in order to verify that the STT has not moved.

The caller ID feature is an indirect method of detecting the location of the STT, since the caller ID implicitly identifies a phone number with a geographic location. Therefore, the accuracy of the caller ID scheme really depends on the inflexibility of the local telephone company. However, it has been found that obtaining a location by caller ID is not very reliable. For example, a long-range cordless telephone allows the STT to initiate the call up to half a mile away from the phone's base station, which is connected to the phone line at the legitimate location.

In addition, the STT could be moved without the service provider's knowledge by relocating the phone line to a new address without changing the number (so called "number portability"). Currently, local telephone companies could do this as long as the new address is served by the same telephone exchange. More sophisticated attacks can be used to move the equipment even further. For example, if the STT is connected to a private branch exchange (PBX) switch connected to the telephone network, the PBX is responsible for generating the ANI and CND, which are passed to the callee. A pirate can purchase a PC-based PBX, and instruct the PBX to generate legitimate ANI and CND identifiers, although the STT is actually connected to a different telephone line.

As apparent from the above-described deficiencies with conventional techniques for determining the location of a set-top terminal, a need exists for a method and apparatus for determining the location of a set-top terminal where the cost of breaking the system is higher than the benefit.

SUMMARY OF THE INVENTION

Generally, a method and apparatus are provided for detecting the movement of a device that receives a signal broadcast from a relative fixed position, such as a signal sent by a geo-synchronous satellite and received by a set-top terminal in a Direct Broadcast Satellite (DBS) system. According to an aspect of the invention, a service provider can detect the movement of a device using the phase shift of the broadcast signal, as received by the device. If the device is moved even by a small amount, the distance between the device and the satellite (or another relative fixed position) will change, thereby causing a measurable phase shift in the signal received by the device. The device periodically or intermittently records a sequence of bits received from the satellite and transmits the recorded bits to the service provider server for analysis. If the device has been moved, the recorded bits will shift.

In one illustrative implementation, the device records a sequence of bits, triggered by an external event, such as an instant of time, shown by an accurate internal clock, a request sent by a terrestrial paging network, or a request sent by a low-earth-orbit (LEO) satellite messaging system. The recording may optionally be performed at unpredictable times, so that a person who has moved a device cannot know when the device will actually start recording.

A service provider can detect relative movements of a device by instructing a group of devices in geographical proximity to start recording at the same time, and comparing the sequence of bits recorded by each device. The geographical proximity is derived from the legitimate location of the corresponding devices, and may be, for example, the devices of one or more neighbors, or a trusted device installed, for example, on a telephone pole in a neighborhood. In this manner, if the reported recording from one of the devices is shifted significantly relative to the other devices in the same geographical proximity, the device has been moved. A shift of one or more bits between the recorded sequences of two adjacent devices indicates that one of the devices was moved.

A more complete understanding of the present invention, as well as further features and advantages of the present invention, will be obtained by reference to the following detailed description and drawings.

DETAILED DESCRIPTION

Figure 1:
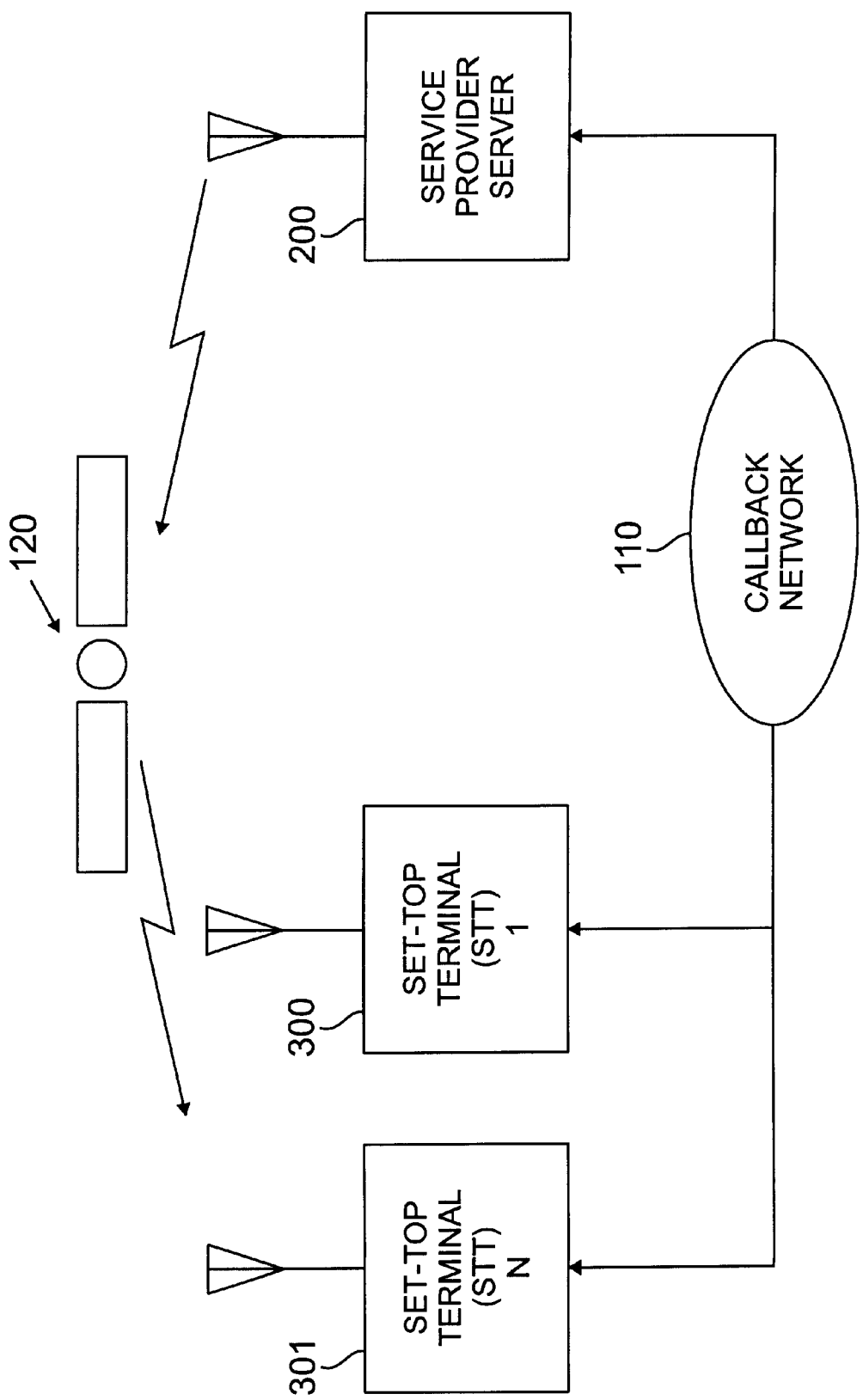
FIG. 1 is a schematic block diagram illustrating a satellite system for broadcasting programming content in accordance with the present invention.

FIG. 1 shows an illustrative network environment for transferring encrypted multimedia information, such as video, audio and data, from a fixed relative position by a service provider, such as a service provider server 300, to one or more customers having devices 400–401, such as set-top terminals, over a wireless broadcast network 120, such as a digital satellite service ("DSS"). Although the devices 400–401 are embodied as set-top terminals in the illustrative implementation, the devices 400–401 may be embodied as any device that receives a signal broadcast from a relative fixed position, such as a geo-synchronous satellite 120. Generally, the service provider 300 transmits the programming content to a geo-synchronous satellite 120, which then broadcasts the content back to the antennas or satellite dishes associated with the set-top terminals 400–401. As used herein, a set-top terminal 300 includes any mechanism to restrict access to the transmitted multimedia information using decryption keys, including for example, a computer configuration and telecommunications equipment.

According to a feature of the present invention, the service provider 300 can detect the movement of a set-top terminal 400 using the phase shift of the satellite broadcast signal, as received by the set-top terminal 400. If the set-top terminal 400 is moved even by a small amount, the distance between the set-top terminal 400 and the satellite 120 will change, thereby causing a measurable phase shift in the signal received by the set-top terminal 400. As discussed further below, the set-top terminal 400 periodically or intermittently records a sequence of bits received from the satellite 120. Thereafter, the set-top terminal 400 transmits the recorded bits to the service provider server 300 for analysis. If the set-top terminal 400 has been moved, the recorded bits will shift.

Figure 7:
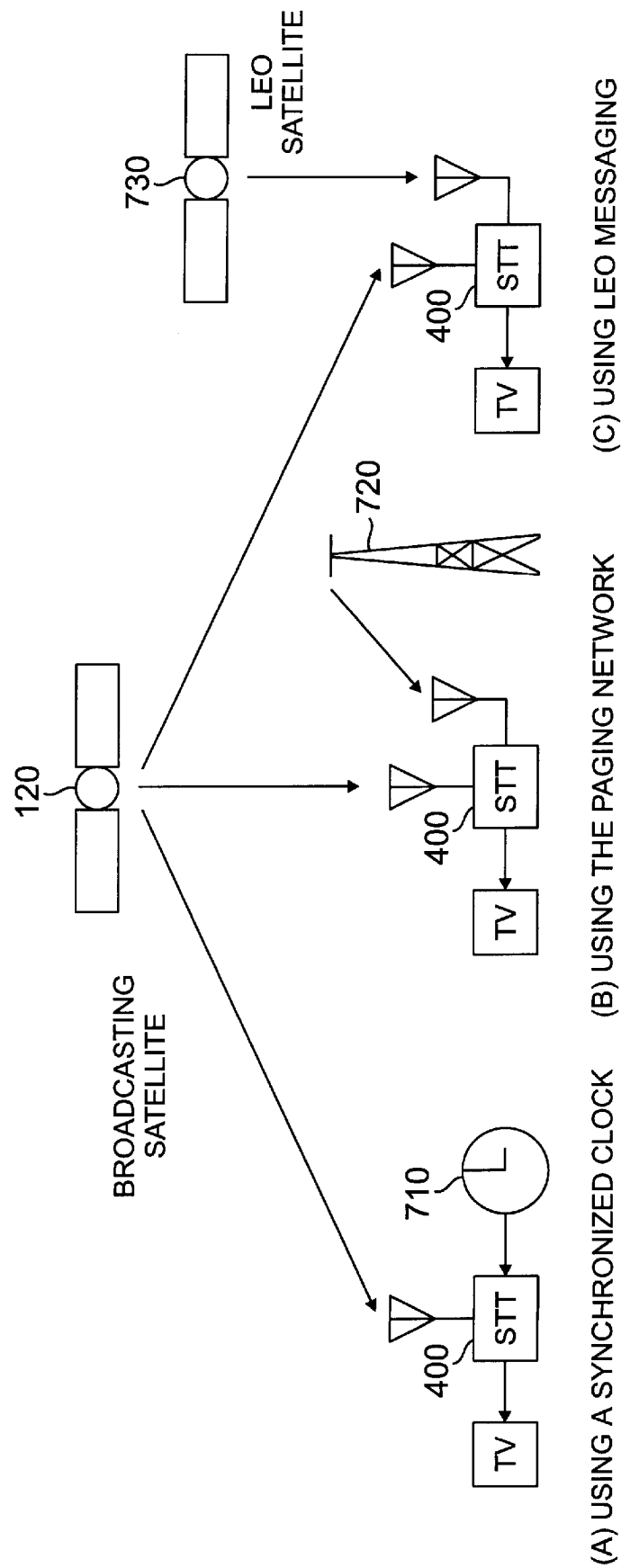
FIGS. 7A through 7C illustrate the satellite ranging system of FIG. 1 triggered using a clock, the paging network and a low-earth-orbit messaging system, respectively.

In one embodiment, the set-top terminal 400 will record the sequence of bits at random intervals, triggered by an external event. As discussed further below in conjunction with FIG. 7, the external event may be, for example, an instant of time, shown by an accurate internal clock, a request sent by a terrestrial paging network, or a request sent by a low-earth-orbit (LEO) satellite messaging system. The recording may be performed at unpredictable times, so that a person who has moved the set-top terminal 400 cannot know when the set-top terminal 400 will actually start recording.

Figure 2:
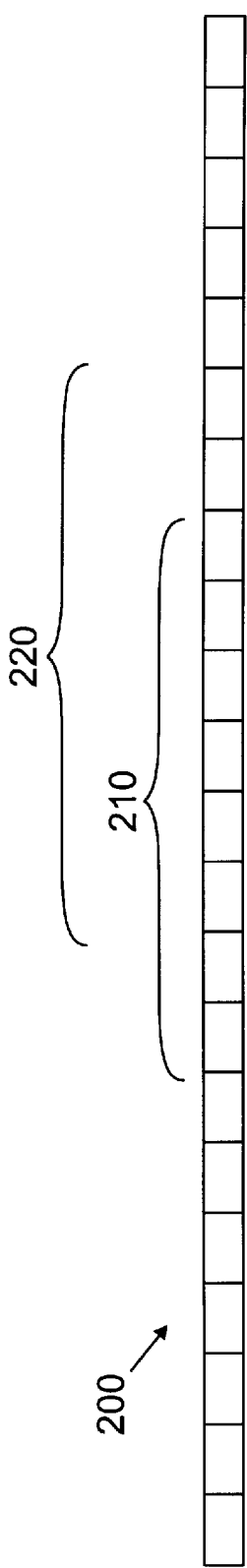
FIG. 2 illustrates sequence of bits in the signal broadcast by the system of FIG. 1.

As discussed further below, the service provider 300 can detect relative movements of the set-top terminals by instructing a group of set-top terminals in geographical proximity to start recording at the same time, and comparing the sequence of bits recorded by each set-top terminal. The geographical proximity is derived from the legitimate location of the corresponding set-top terminals, and may be, for example, the set-top terminal of one or more neighbors, or a trusted set-top terminal installed, for example, on a telephone pole in a neighborhood. In this manner, if the reported recording from one of the set-top terminals 400 is shifted significantly relative to the other set-top terminals in the same geographical proximity, the set-top terminal 400 has been moved. Thus, as shown in FIG. 2, a sequence of bits 210 recorded by a first set-top terminal 400 from a received broadcast signal 200 may be compared to a sequence of bits 220 recorded by a second set-top terminal 401 in close geographical proximity. A shift of one or more bits between the recorded sequences 210 and 220 indicates that one of the set-top terminals 400–401 was moved.

Figure 3:
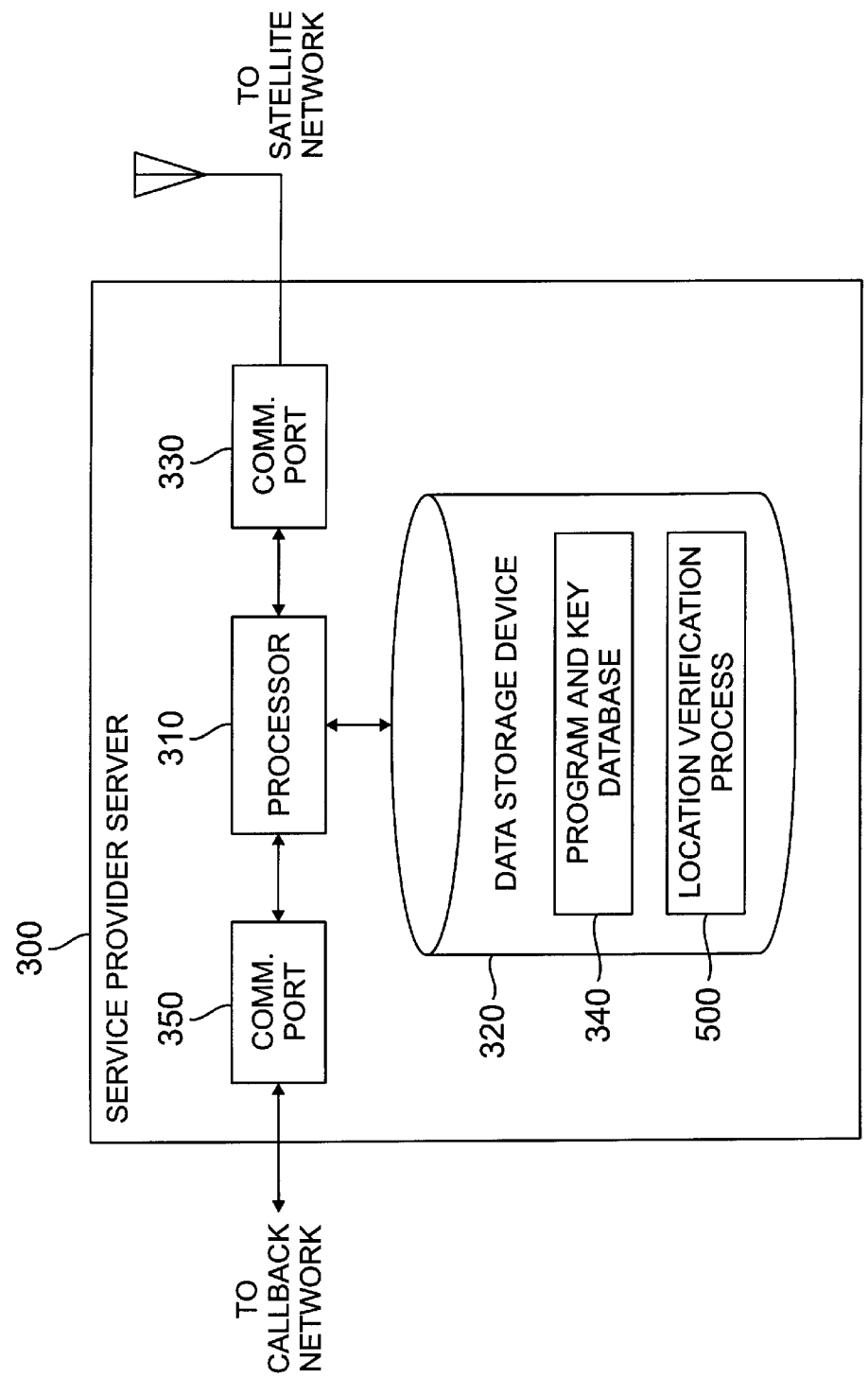
FIG. 3 is a schematic block diagram of an exemplary service provider server of FIG. 1.

FIG. 3 is a block diagram showing the architecture of an illustrative service provider server 300. The service provider server 300 may be associated with a television network, a cable operator, a digital satellite service operator, or any service provider broadcasting encrypted programming content over a satellite network. The service provider server 300 may be embodied, for example, as an RS 6000 server, manufactured by IBM Corp., as modified herein to execute the functions and operations of the present invention. The service provider server 300 preferably includes a processor 310 and related memory, such as a data storage device 320. The processor 310 may be embodied as a single processor, or a number of processors operating in parallel. The data storage device 320 and/or a read only memory (ROM) are operable to store one or more instructions, which the processor 310 is operable to retrieve, interpret and execute.

The data storage device 320 preferably includes one or more databases 340 for storing information on each program that will be transmitted by the server 300, as well as encryption keys, in a known manner. In addition, as discussed further below in conjunction with FIG. 5, the data storage device 320 preferably includes a location verification process 500. Generally, the location verification process 500 instructs one or more set-top terminals 400–401 to record a sequence of bits and to provide the recorded bits to the service provider server 300 for analysis. The communications port 330 connects the service provider server 300 to the satellite 120, thereby allowing the service provider server 300 to broadcast messages to each set-top terminal 400–401 shown in FIG. 1. The communications port 350 connects the service provider 300 to the callback network 110, by which the set-top terminals 400–401 provide the recorded sequence of bits to the service provider 300.

Figure 4:
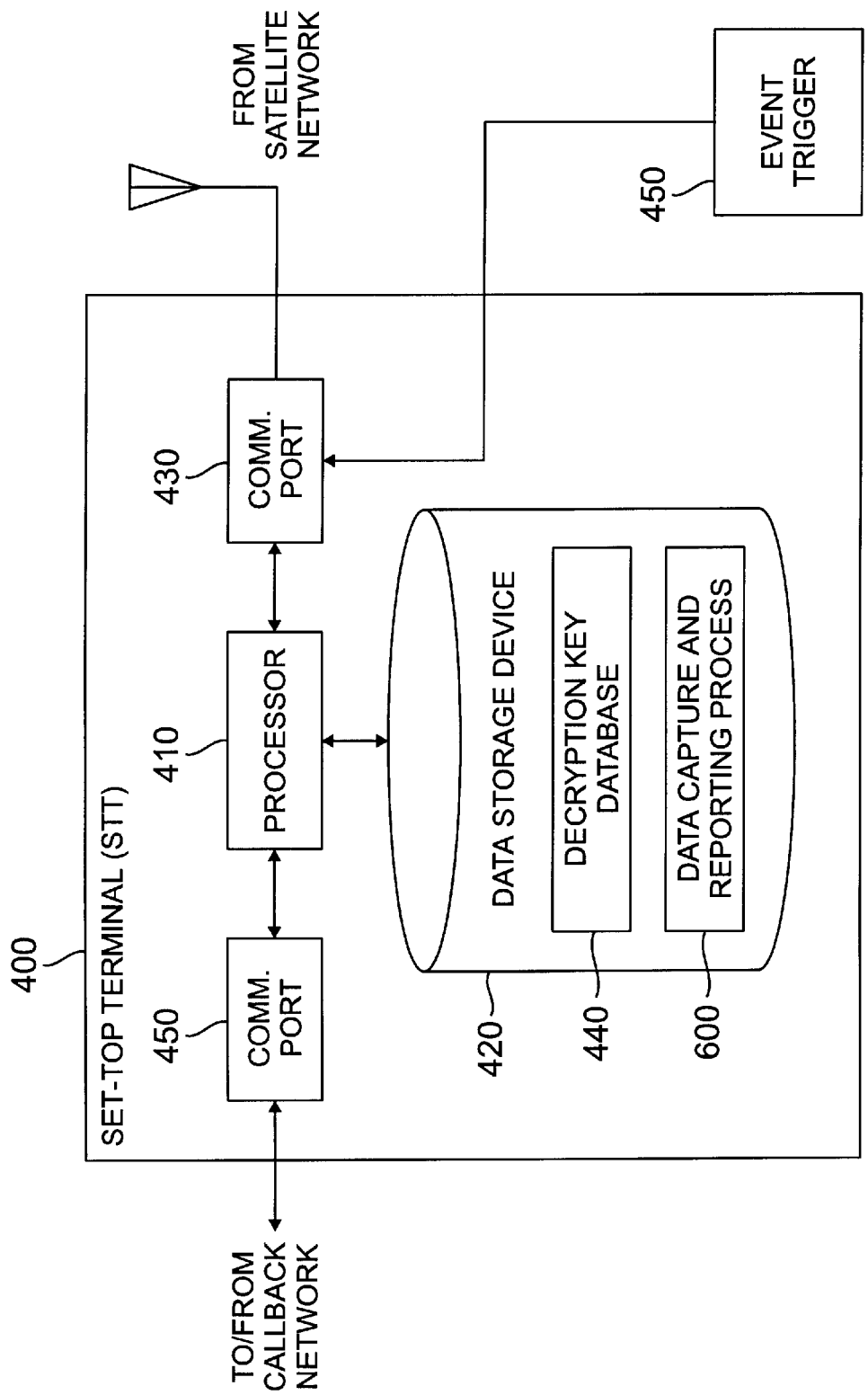
FIG. 4 is a schematic block diagram of an exemplary set-top terminal of FIG. 1.

FIG. 4 is a block diagram showing the architecture of an illustrative set-top terminal 400. The set-top terminal 400 may be embodied, for example, as a set-top terminal (STT) associated with a television, such as those commercially available from General Instruments Corp., as modified herein to execute the functions and operations of the present invention. The set-top terminal 400 preferably includes a processor 410 and related memory, such as a data storage device 420, as well as communication ports 430 and 450, which operate in a similar manner to the hardware described above in conjunction with FIG. 3.

The data storage device 420 preferably includes a decryption key database 440. The decryption key database 440 is preferably stored in a secure portion of the data storage device 420. The decryption key database 440 preferably stores a key for each program or package that the customer is entitled to, in a known manner. In addition, as discussed further below in conjunction with FIG. 6, the data storage device 420 preferably includes a data capture and reporting process 600. Generally, the data capture and reporting process 600 records a sequence of bits when instructed by the service provider server 300, and thereafter provides the recorded bits to the service provider server 300 for analysis.

Figure 5:
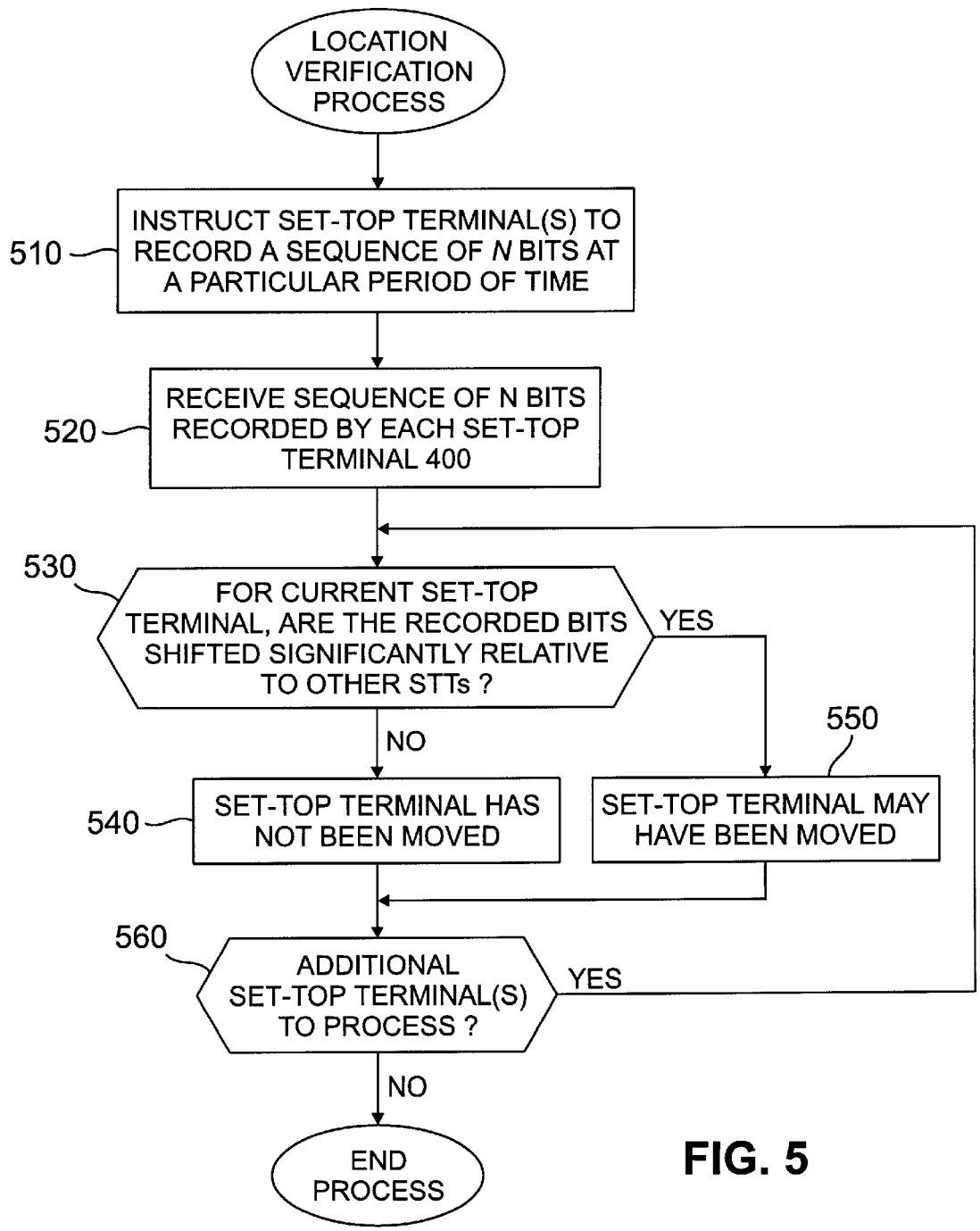
FIG. 5 is a flow chart describing an exemplary location verification process as implemented by the service provider server of FIG. 3.

As previously indicated, the location verification process 500 (FIG. 5) instructs one or more set-top terminals 400–401 to record a sequence of bits and to provide the recorded bits to the service provider server 300 for analysis. As shown in FIG. 5, the location verification process 500 initially instructs a set of set-top terminals 400–401 in geographical proximity to start recording at the same time during step 510. As discussed further below in conjunction with FIGS. 7A through 7C, the recording by the various set-top terminals 400–401 may be triggered, for example, using a synchronized clock, the paging network or a low-earth-orbit messaging system. In an embodiment where the set-top terminals 400–401 are triggered utilizing a synchronized clock, the set-top terminals 400–401 are notified during step 510 of a future time to start recording. In an embodiment where the set-top terminals 400–401 are triggered utilizing the paging network or a low-earth-orbit messaging system, a message is sent to the set-top terminals 400–401 during step 510 to start the recording at the instant that the message is received.

After the set-top terminals 400–401 have recorded the sequence of N bits, the service provider server 300 will receive the recorded bits from each set-top terminal 400–401 via the callback network 110 during step 520. Once all of the set-top terminals 400–401 have reported the recorded bits, a test is performed during step 530 to determine if the bits recorded by each set-top terminal 400–401 are shifted significantly relative to the other set-top terminals 400–401 in geographical proximity. If it is determined during step 530 that the bits recorded by the current set-top terminal 400 are not shifted significantly relative to the other set-top terminals 400–401, then it is determined during step 540 that the set-top terminal 400 has not been moved.

If, however, it is determined during step 530 that the bits recorded by the current set-top terminal 400 are shifted significantly relative to the other set-top terminals 400–401, then it is determined during step 550 that the set-top terminal 400 has likely been moved.

A test is then performed during step 560 to determine if there are any additional set-top terminals 400–401 to be processed. If it is determined during step 560 that there are additional set-top terminals 400–401 to be processed, then program control returns to step 530 and continues in the manner described above. If, however, it is determined during step 560 that there are no additional set-top terminals 400–401 to be processed, then program control terminates.

Figure 6:
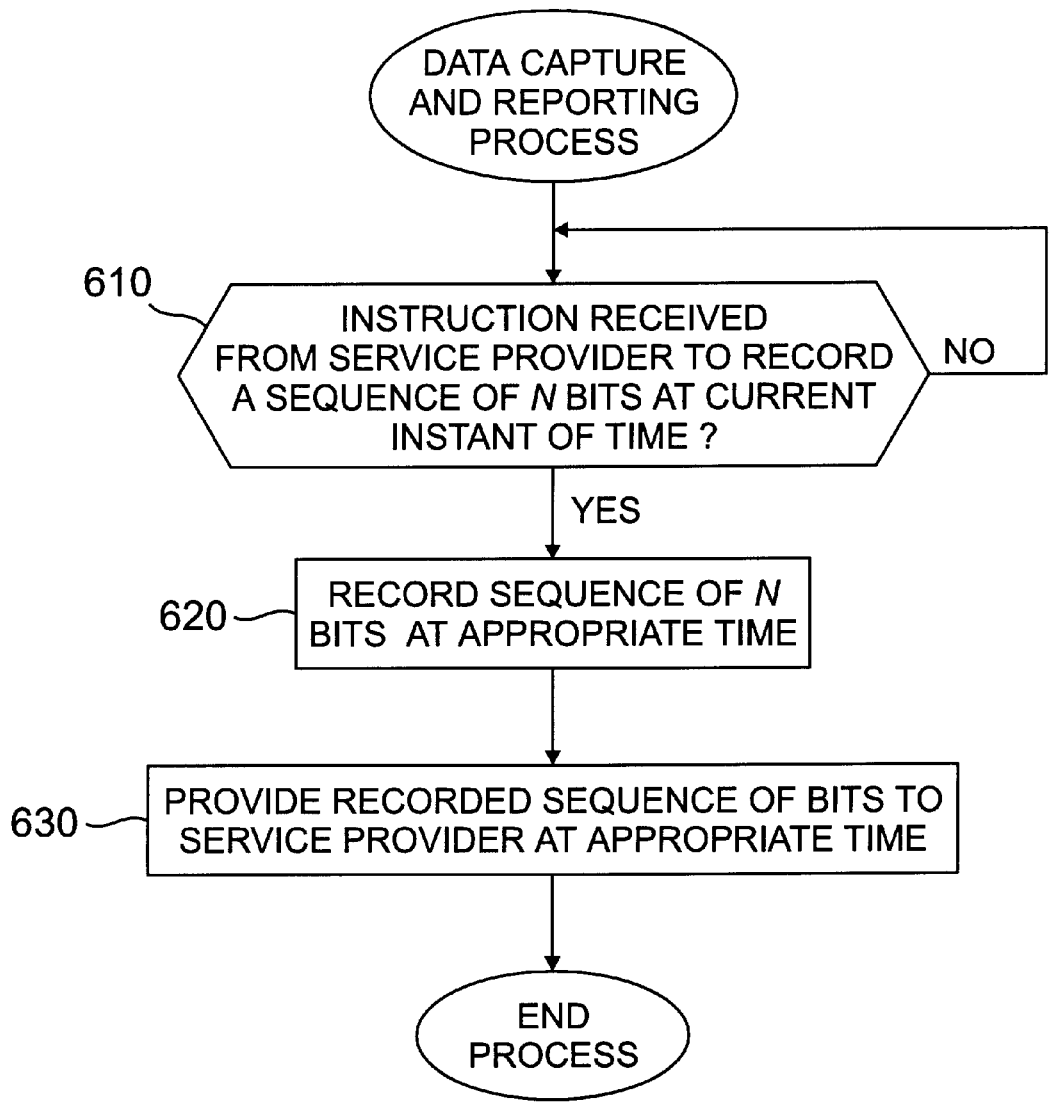
FIG. 6 is a flowchart describing an exemplary data capture and reporting process as implemented by the set-top terminal of FIG. 4.

As previously indicated, the data capture and reporting process 600 (FIG. 6) records a sequence of bits when instructed by the service provider server 300, and thereafter provides the recorded bits to the service provider server 300 for analysis. As shown in FIG. 6, the data capture and reporting process 600 continuously monitors incoming messages during step 610 until it has received an instruction from the service provider 300 to begin recording a sequence of N bits at the current instant of time. As previously indicated, in an embodiment where the set-top terminals 400–401 are triggered utilizing a synchronized clock, the set-top terminals 400–401 are notified of a future time to start recording and monitor for the indicated start time during step 610. In an embodiment where the set-top terminals 400–401 are triggered utilizing the paging network or a low-earth-orbit messaging system, the set-top terminals 400–401 monitor during step 610 for a received message instructing the set-top terminal to start recording at the instant that the message is received.

Once the data capture and reporting process 600 detects during step 610 that it should begin recording, the data capture and reporting process 600 will record the sequence of N bits during step 620. The data capture and reporting process 600 will then provide the recorded sequence of bits to the service provider 300 during step 630 via the callback network 110 (at the appropriate reporting time indicated by the service provider 300), before program control terminates.

External Triggers

As previously indicated, the set-top terminal 400 will record the sequence of bits at random intervals, triggered by an external event. The external event may be, for example, an instant of time, shown by an accurate internal clock, a request sent by a terrestrial paging network, or a request sent by a low-earth-orbit (LEO) satellite messaging system. In one preferred embodiment, the command to initiate the recording of received bits is encrypted, so that only the target set-top terminal 400 would recognize the command. Thus an eavesdropper cannot recognize when the service provider 300 instructs a particular set-top terminal 400 to start recording. Only when the set-top terminal 400 contacts the service provider 300 (some time after the recording has ended) to report the recorded sequence of bits, can the eavesdropper discover that a recording has occurred.

FIG. 7A illustrates a set-top terminal 400 that is triggered by an accurate clock 710 that shows the same time in all set-top terminals. The service provider 300 broadcasts an encrypted message via the satellite 120 that addresses a subset of the STTs 400–401. The message specifies some absolute future time for starting the recording of a pre-defined number of bits. The actual sequence of bits recorded by each set-top terminal 400–401 will depend on the respective distance of each set-top terminal 400–401 from the satellite 120, since all of the STTs 400–401 start recording at the same instant. An accurate clock may be obtained, for example, by using a GPS system, or by including timing signals in the satellite TV broadcast and sending a correction individually to each STT based on its legitimate location. The correction will be included in the first communication between the STT 400–401 and the service provider 300. The STT 400–401 can derive an accurate clock pulse from the satellite's signal, which is inherently more accurate than an internal low-cost clock.

FIG. 7B illustrates a set-top terminal 400 that is triggered by a terrestrial paging system 720. The terrestrial paging system 720 sends an encrypted request to the set-top terminal 400 to start the recording at the instant that the message is received.

FIG. 7C illustrates a set-top terminal 400 that is triggered by a low-earth-orbit (LEO) satellite messaging system 730, such as the ORBCOMM system, commercially available from ORBCOMM Corporation, 21700 Atlantic Blvd., Dulles, Va. 20166-6801, USA and described in ORBCOMM System Description, http://www.orbcomm.com/about/sysdesc.html. The low-earth-orbit (LEO) satellite messaging system 730 sends an encrypted request to the set-top terminal 400 to start the recording at the instant that the message is received. In addition, since the low-earth-orbit (LEO) satellite messaging system 730 permits bi-directional communication, the low-earth-orbit (LEO) satellite messaging system 730 may be utilized for the callback, without the need for a separate telephone line.

Accuracy

The raw bit rate of a digitally-modulated signal arriving from a particular transponder on the satellite at a baud rate of r would be rk bits-per-second, where the ratio k depends on the modulation and error correction schemes used in the physical layer. For example, the DirecTV™ satellite system uses QPSK modulation at a baud rate of 27 MHz, to achieve a bit rate of approximately 30 Mbps, yielding a ratio, k, of approximately 1.11. The movement of a set-top terminal 400 can be detected only if it results in a phase shift of more than one cycle (one bit). Assuming that the distance of the set-top terminal 400 from the satellite 120 changes from d to d' and the signal is propagated at the speed of light c, then a phase shift in the digital bit stream can be detected only if:

$$\frac{|d'-d|}{c} \geq \frac{1}{r}$$

If s=c/r denotes the minimal distance change that will cause a detectable phase shift, then a movement from distance d to distance d' would result in a shift of:

$$k \cdot \left\lfloor \frac{|d'-d|}{s} \right\rfloor$$

bits in a k bit-per-baud modulation scheme. For example, in the DirecTV™ example, a change of about 11 m in the distance to the satellite 120 would cause a 1-bit shift.

Figure 8:
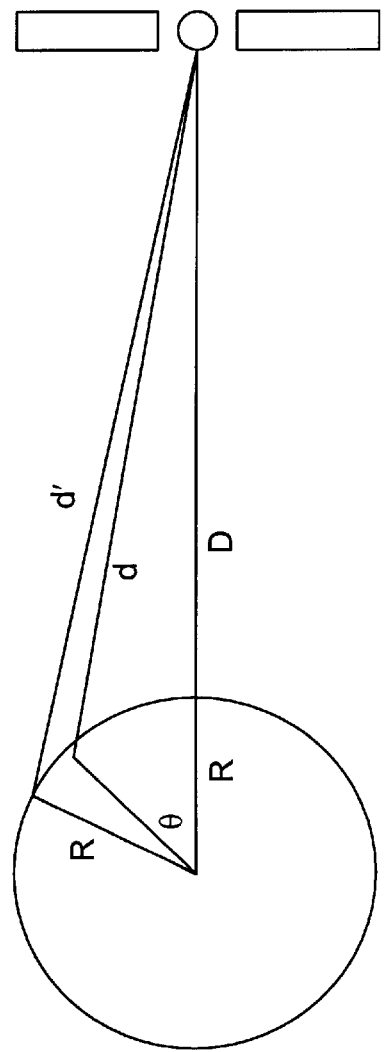
FIG. 8 illustrates the distance between a set-top terminal on Earth and the satellite of FIG. 1.

As shown in FIG. 8, the distance d between a set-top terminal 400 on Earth and a geo-synchronous satellite 120 is determined by several parameters. Assume that the set-top terminal 400 is located at longitude $\lambda_1$, latitude $\theta$, and altitude h, and the satellite is at longitude $\lambda_2$ above the equator at the geo-synchronous altitude of D=35803 km.

If $k=|\lambda_1-\lambda_2|$ is the difference between the longitudes, then the distance to the satellite (also called the "slant range") is given by:

$$d=\sqrt{(R+h)^2+(R+D)^2-2(R+h)(R+d)\cos\theta\cos\lambda} \qquad \text{Eq. (1)}$$

where R=6367 km is the radius of the Earth.

For illustration, it is assumed that the set-top terminal 400 is at altitude h=0 and that the satellite 120 and set-top terminal 400 are on the same longitude (in other words, $\lambda=0$). Using Equation [1], the magnitude of terrestrial movement that would cause a change of s in the distance to the satellite can be computed. For example, in the DirecTV™ example, the satellite 120 is located at longitude 101° W. Thus, a movement of 15–20 m either north or south anywhere in the continental United States would be noticeable. However, this estimation is accurate only if the set-top terminal 400 has a perfect clock, which is unrealistic. If the clock of the set-top terminal 400 has an accuracy of a seconds, then an observed change of ac meters in the distance to the satellite can be a measurement error (where c is the speed of light).

For example, if the clock is accurate up to 340 nanoseconds, as is the case for the SPS signal from a GPS system, the system would only detect differences of at least 102 m in the distance to the satellite 120. In the DirecTV™ example, terrestrial north-south movements of 140–180 m in the United States would be detectable. Specifically, moving 146 m north from Buffalo, N.Y. (43° N, 79° W) or 176 m south from San Diego, Calif. (32° N, 117° W) should be detectable. Buffalo and San Diego were selected for illustration since these cities are close to the Canadian and Mexican borders, respectively.

Since we are ranging to a single satellite 120, the points that are at a distance d from the satellite 120 define the surface of a sphere centered at the satellite. As long as the set-top terminal 400 stays on this sphere no phase shift will occur. For example, if the new location has the same altitude as the legitimate location, then the points that are equidistant from the satellite typically define a circle on Earth, which means that there are two directions of movement that can go undetected (along this circle). However, given that the sensitivity of the present invention is on the order of 140–180 meters, moving the set-top terminal 400 without changing its distance to the satellite 120 is a rather unlikely event.

It is to be understood that the embodiments and variations shown and described herein are merely illustrative of the principles of this invention and that various modifications may be implemented by those skilled in the art without departing from the scope and spirit of the invention.

We claim:

1. A method of detecting the movement of a device that receives a signal broadcast from a relative fixed position, said method comprising the steps of:

receiving a sequence of bits recorded from said signal by at least two devices in geographical proximity at the same time; and detecting the movement of one of said devices by comparing each of said recorded sequences of bits to each other.

2. The method according to claim 1, wherein said devices are instructed to record at the same time using a synchronized clock.

3. The method according to claim 1, wherein said devices are instructed to record at the same time using a paging network.

4. The method according to claim 1, wherein said devices are instructed to record at the same time using a low-earth-orbit messaging system.

5. The method according to claim 1, wherein said two devices in geographical proximity are in the same neighborhood.

6. The method according to claim 1, wherein at least one of said devices is a trusted device.

7. The method according to claim 1, wherein said devices are set-top terminals.

8. The method according to claim 1, wherein said signal is broadcast from a fixed relative position by a geo-synchronous satellite.

9. A method of detecting the movement of a device that receives a signal broadcast from a fixed relative position, said method comprising the steps of:

receiving a predefined number of bits recorded from said signal by said device; and determining if said device has been moved by comparing said recorded predefined number of bits to an expected set of bits.

10. The method according to claim 9, wherein said device is instructed to record at the period of time using a synchronized clock.

11. The method according to claim 9, wherein said device is instructed to record at the period of time using a paging network.

12. The method according to claim 9, wherein said device is instructed to record at the period of time using a low-earth-orbit messaging system.

13. The method according to claim 9, wherein said expected set of bits are obtained from a device in geographical proximity.

14. The method according to claim 9, wherein said expected bits are obtained from a trusted device.

15. The method according to claim 9, wherein said device is a set-top terminal.

16. The method according to claim 9, wherein said signal is broadcast from a fixed relative position by a geo-synchronous satellite.

17. A method of detecting the movement of a device that receives a signal broadcast from a fixed relative position, said method comprising the steps of:

receiving a predefined number of bits recorded from said signal by said device; and determining if said device has been moved by identifying a phase shift of said recorded bits.

18. The method according to claim 17, wherein the phase shift of said recorded bits is detected by comparing said recorded bit to an expected set of bits.

19. A system for detecting the movement of a device that receives a signal broadcast from a fixed relative position, said system comprising:

means for receiving a predefined number of bits recorded from said signal by said device; and a processor to determine if said device has been moved by comparing said recorded predefined number of bits to an expected set of bits.

20. A system for detecting the movement of a device that receives a signal broadcast from a fixed relative position, said system comprising:

means for receiving a predefined number of bits recorded from said signal by said device; and a processor to determine if said device has been moved by identifying a phase shift of said recorded bits.

* * * * *